Oct. 21, 1958    M. E. BOURNS ET AL    2,857,149
LINEAR-TYPE ACCELERATION SENSING DEVICE
Original Filed May 15, 1952
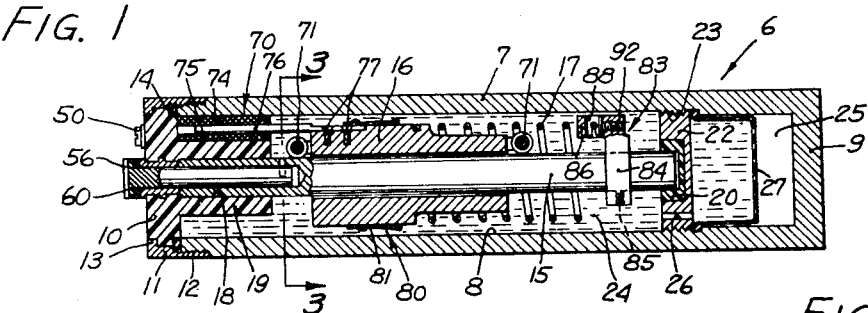
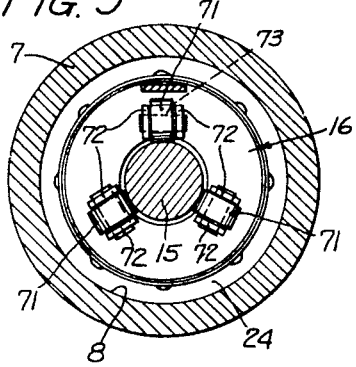
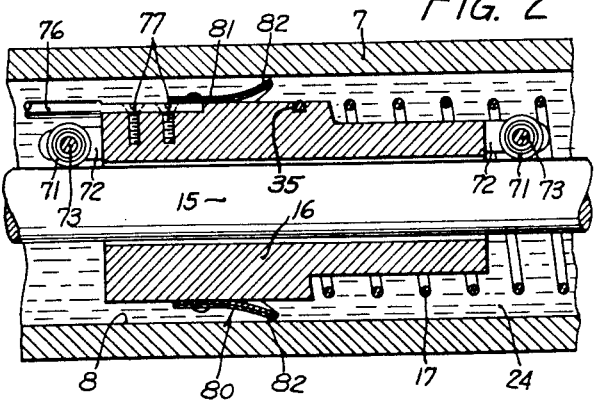
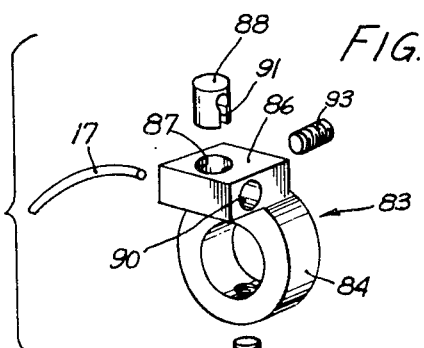
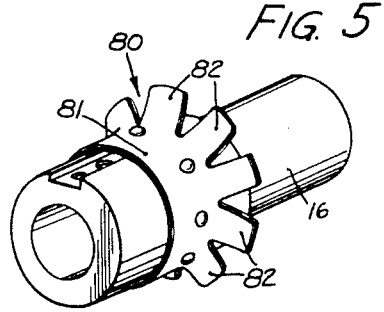
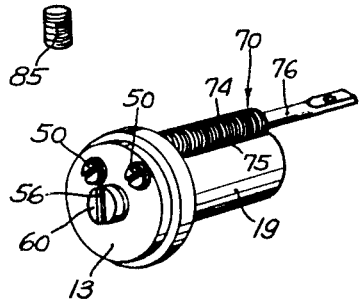
INVENTORS
MARLAN E. BOURNS
MARVIN E. HARRISON
JAMES D. YOUNG
BY Herbert E. Kidder
AGENT

United States Patent Office 2,857,149
Patented Oct. 21, 1958

2,857,149

LINEAR-TYPE ACCELERATION SENSING DEVICE

Marlan E. Bourns, Marvin E. Harrison, and James D. Young, Riverside, Calif.

Original application May 15, 1952, Serial No. 287,968, now Patent No. 2,831,670, dated April 22, 1958. Divided and this application December 19, 1955, Serial No. 554,085

3 Claims. (Cl. 264—1)

The present invention is a division of our pending application, Serial No. 287,968, filed May 15, 1952, now Patent No. 2,831,670, for Linear-Type Acceleration Sensing Device. The invention relates to acceleration sensing devices, and more specifically to a linear type of device particularly designed for installation in airplanes, guided missiles, and the like, to provide electrical signals that can be utilized to operate controls on the vehicle, or that can be relayed by telemetering equipment to recording instruments on the ground to record accelerations experienced by the aircraft or missile. For work of this type, it is essential that the instrument be extremely compact and exceedingly accurate under the extreme conditions encountered in aircraft and missile applications, and at the same time, rugged enough to withstand the severe stresses imposed on the equipment. One object of the invention, therefore, is to provide an instrument that meets these specifications.

Another object of the invention is to provide an instrument that will measure accelerations in both senses of one direction with a high degree of accuracy and sensitivity, but will not respond appreciably to accelerations in directions other than the ones desired.

Another object is to provide an acceleration sensing device in which the spring-mass system is damped, so that the electrical signal is representative of the accelerations being measured, and does not tend to lag or overshoot. In this connection, damping is provided by a fluid medium, and in order to prevent variation in the damping effect due to change in viscosity of the fluid medium caused by temperature change, thermostatic means is provided for varying the damping rate to correspond to the viscosity of the fluid medium.

Still another object is to provide an instrument of simplified design which is well adapted to mass production techniques, and in which the operating mechanism may be assembled, adjusted, and calibrated outside of the case to facilitate production and calibration of the instrument.

The foregoing objects are achieved in the present invention by providing a body having a chamber, within which is disposed a sliding mass member supported on anti-friction bearings for movement along a straight line. A helical spring is attached to the body and to the mass member to exert a yielding restraint on the latter against movement in either direction. A variable output impedance element is operatively connected between the body and the mass member so as to produce an electrical signal responsive to movement of said mass member from a given reference point against the thrust of the spring. The electrical signal may be in the form of a variation in voltage or current flow, which can be utilized in a suitable circuit for control purposes or in telemetering equipment. In this embodiment of our invention, the impedance element takes the form of a variable inductance. The invention is not limited to an inductance unit, however, as certain phases thereof may be used to equal advantage with resistance and capacitance units.

Other objects and advantages of the present invention will become apparent to those skilled in the art upon consideration of the following detailed description of the preferred embodiment thereof, reference being had to the accompanying drawings, wherein:

Figure 1 is a median sectional view through an acceleration sensing unit embodying the principles of our invention;

Figure 2 is an enlarged fragmentary sectional view through the same, showing the bi-metal thermostat vanes on the mass member in extended position to increase the damping effect of the fluid at elevated temperatures;

Figure 3 is an enlarged transverse section through the unit, taken at 3—3 in Figure 1, showing the disposition of anti-friction rollers supporting the movable mass;

Figure 4 is an exploded view of the locking member for securing the end of the spring to the shaft on which the mass member slides;

Figure 5 is a perspective view of the mass member illustrated in Figures 1 and 2; and Figure 6 is a perspective view of the lid closing the end of the cylindrical body in Figure 1, showing an inductance coil mounted thereon.

The acceleration sensing device of the invention is seen to comprise a body 6 which, in the preferred form, consists of a metal tubular casing 7 having a cylindrical bore 8 provided therein. The bore 8 is closed at one end by an end wall 9, and at the other end by a non-conductive lid 10, preferably of plastic, which is held in place by a sleeve 11. Sleeve 11 is screwed onto a threaded portion 12 of the casing 7 and is provided with an inwardly projecting radial flange 13 that engages the outer edge of the lid. An O-ring 14 seals the junction of the casing with the lid. Mounted within the casing on the longitudinal axis thereof is a shaft 15, and slidably supported thereon is a mass member 16, which is yieldingly restrained against movement in either direction along the shaft by a helical spring 17.

The left-hand end of the shaft 15, as viewed in Figure 1, is inserted into a bore 18 in a hub 19 of the lid, and is freely rotatable therein. The right-hand end of the shaft is also rotatably held by a rubber or plastic bushing 20, which is seated in a counterbore in the center of a disk 22. The disk 22 is threaded on its periphery and is screwed into threads 23 on the inside surface of the casing 7, forming a partition dividing the interior of the casing into a main chamber 24 and an expansion chamber 25. The main chamber 24 is filled with a fluid damping medium, such as silicone oil, which has a restraining action on movement of the mass member 16 along the length of the shaft 15.

The expansion chamber 25 communicates with the main chamber 24 through a vent 26 in the disk, and on the right-hand side of the disk the fluid is contained by means of a cup-shaped diaphragm 27 of rubber or other elastomer, having a bead around its edge that is tightly clamped between opposed shoulders on the disk 22 and casing 7. The portion of the chamber to the right of the diaphragm 27 is filled with air, and the elastic diaphragm stretches or contracts to accommodate any volumetric change of the damping fluid resulting from temperature changes.

The mass member 16 is preferably formed as a cylindrical block of solid brass or other electrically conductive metal, and is supported on two sets of anti-friction rollers 71, disposed at opposite ends of the mass. Each group consists of a plurality, preferably three in number, of rollers spaced equidistantly around the shaft 15 as shown in Figure 3. Each roller 71 is disposed between a pair of laterally spaced lugs 72 projecting axially from the end of the mass member 16, and is rotatably supported on a shaft 73 which is held at its end by the said lugs. The rollers 71 may, for convenience, be in the form of ball bearings, the outer race of which forms the roller riding on the shaft 15. Under certain circumstances, it may not be necessary to use antifriction rollers, and in this case the rollers 71 would be provided with plain sleeve bearings, which would be journaled on the shaft 73. The widely spaced sets of rollers at opposite ends of the mass 16 maintain alignment of the latter on the shaft 15, and provide substantially frictionless support for the mass.

One end of the spring 17 is received within and soldered to a spiral groove 35 in the outside surface of the mass 16, while the other end of the spring is attached to a fitting 83, which is adjustably secured on the shaft 15. The fitting 83 comprises a ring 84 which encircles the shaft 15 and is secured thereto by a set screw 85. A block 86 is mounted on the top side of ring 84, and a vertical hole 87 is formed therein to receive a plug 88. Intersecting the hole 87 and extending all the way through the block 86 is another hole 90, through which the end of the spring 17 extends. The plug 88 is slotted diametrically at 91 from its bottom end, and the inner end of the slot is enlarged slightly to receive the end of spring 17. A tapped hole 92 (see Figure 1) intersects the hole 87 at right angles to the latter, and a set screw 93 is screwed into the tapped hole, bearing against one side of the slotted plug 88 and clamping the latter tightly around the spring 17. The locking device which is described has the advantage of being adjustable both along the shaft 15 and along the spring 17, providing a positive anchorage for the spring without distorting the latter or imposing any strain therein which would affect the springing rate of the same. Plug 88 is rotatable within the hole 87 when set screw 93 is backed out, which permits it to take the angle of the spring 17, without bending the latter. Hole 90 should also be large enough to accommodate various pitch angles of the spring 17, and also to accommodate the helical curvature of the spring.

Sliding motion of the mass 16 along the shaft 15, responsive to acceleration of the unit along a line parallel to the axis of the shaft, is translated into an electrical signal by means of a variable impedance element 70, which in the present instance takes the form of an inductor. The term impedance, as used herein, is not limited to inductors, however, but includes resistors and capacitors, or any combination thereof.

The inductor 70 comprises a coil 74 seated within a slot 75 in the hub portion 19 of lid 10. The ends of the coil are connected to terminals 50. The inductance of the coil 74 is varied by means of an iron core 76 in the form of a rod attached by screws 77 to the mass member 16 and projecting axially from the left-hand end thereof. The core extends into the hollow center of coil 74, causing the inductance of the coil to vary as a function of the distance to which the core extends into the coil. An alternating current is applied to the terminals 50, and the amount of current passing through the coil 74 is governed by the inductance, which depends, in turn, on the distance to which the core 76 projects into the coil. The electrical signal, in this case, is represented by the fluctuation of current from some predetermined reference level.

The inductor 70 could also take the form of a mutual inductance (not shown) in which there would be a primary and secondary coil. In this case, alternating current would be fed into the primary coil, and an induced current taken from the secondary coil, as is well understood in the art. The amount of current induced in the secondary coil would depend upon the magnetic linkage between the two coils, and this could be controlled by shifting the position of the secondary coil with respect to the primary, or by shifting a magnetic core relative to fixed primary and secondary coils. Other obvious variations will occur to those skilled in the art.

Movement of the mass member 16 within the chamber 24 is damped by means of a fluid medium, and in certain installations wherein the instrument is exposed to extremes of temperature variation, the damping fluid may undergo a considerable change in viscosity, which affects the damping rate. In order to maintain a substantially uniform damping rate under conditions of varying viscosity, we provide thermostatically controlled means for varying the resistance to movement of the mass 16 within its fluid medium in inverse proportion to the viscosity of the fluid. The thermostatically controlled means is designated in its entirety by the reference numeral 80, and comprises a bi-metallic sleeve 81 riveted to the mass member 16 and having a plurality of vanes 82 projecting from one end thereof. The unit 80 is arranged so that elevated temperatures when the viscosity of the fluid medium is low, the vanes 82 project radially outward, as in Figures 2 and 5, blocking the space between the mass member 16 and inner surface of the chamber 24, and providing considerably increased resistance to movement of the fluid from one side of the vanes to the other. This increased resistance has the effect of increasing the damping effect, thereby compensating for the reduced viscosity of the fluid medium at high temperature.

When the fluid becomes cold and its viscosity increases, the bi-metal vanes 82 draw in flat against the side of the mass member 16, as in Figure 1. In this condition, the unit 80 provides the minimum resistance to flow of the fluid past the member 16, thereby reducing the damping effect to compensate for increased viscosity of the fluid.

The instrument is mounted in the missile, aircraft, or other device being tested, by means of screws (not shown) which are threaded into tapped holes in the end wall 9 of the body. The body is mounted with its longitudinal axis parallel to the direction of acceleration being measured. When the unit is subjected to accelerations in the direction of the axis of shaft 15, inertia of the mass member 16 causes the latter to slide along the shaft 15 against the resistance of the spring 17. This shift in position of the mass member produces a corresponding shift in the relative position of the stationary and movable parts of the variable impedance 70, causing an electrical signal to be produced that can be used for control or telemetering purposes.

While we have shown and described in considerable detail what we believe to be the preferred form of our invention, it will be understood that various changes may be made in the shape and arrangement of the several parts without departing from the broad scope of the invention, as defined in the following claims.

We claim:

1. An acceleration sensing device comprising a body, a support member attached to said body, a mass mounted on said support member for movement along the length thereof, a spring attached at one end to said mass, and clamping means for securing the other end of said spring to said support member, said clamping means comprising a part slidably mounted on said support member, means for securing said part to said support member in adjusted position, a clamp pivoted on said part and adapted to receive a portion of said spring, said clamp being pivoted on said part to accommodate itself to the contour of said spring, and means for securing said clamp rigidly to said part.

2. An acceleration sensing device comprising a body, a shaft fixed to said body, a mass slidably mounted on said shaft, a spring attached at one end to said mass, and clamping means for securing the other end of said spring to said shaft, said clamping means comprising a member slidably mounted on said shaft, means for securing said member to said shaft in adjusted position, said member having a hole formed therein, a diametrically slotted plug disposed within said hole, said other end of said spring being received within the slot in said plug, there being a tapped hole intersecting said first-named hole at right angles thereto, and a set screw threaded into said tapped hole and bearing against one side of said plug to clamp the same tightly to said spring.

3. In an acceleration sensing device, a body having a cylindrical bore formed therein, a shaft attached at its ends to said body and extending lengthwise of said bore along the axis thereof, a mass member slidably mounted on said shaft, a spring attached at one end to said mass member and at the other end to said body, said spring opposing movement of said mass member relative to said body, means for producing an electrical signal that is a function of the position of said mass member along the length of said shaft, a fluid damping medium filling said cylindrical bore, and a bi-metallic collar encircling said mass member and attached at one end thereto, the other end of said collar being slotted to form a plurality of angularly spaced vanes which are adapted to move out into the space between said mass and the inner surface of said bore as the temperature of said fluid damping medium rises, so as to compensate for the diminished viscosity of said fluid damping medium at elevated temperatures.

References Cited in the file of this patent

UNITED STATES PATENTS

| | | |
|---|---|---|
| 2,087,426 | Bechereau et al. | July 20, 1937 |
| 2,332,994 | Draper | Oct. 26, 1943 |
| 2,484,165 | Hathaway | Oct. 11, 1949 |
| 2,640,900 | Klose | June 2, 1953 |
| 2,643,869 | Clark | June 30, 1953 |
| 2,697,594 | Stanton | Dec. 21, 1954 |

FOREIGN PATENTS

| | | |
|---|---|---|
| 672,042 | France | Sept. 14, 1929 |